Dec. 16, 1969   H. L. LINDSTROM   3,483,983
WATER PURIFICATION SYSTEM
Filed July 14, 1967   3 Sheets-Sheet 1

INVENTOR
HORACE L. LINDSTROM
BY Beale and Jones
ATTORNEYS

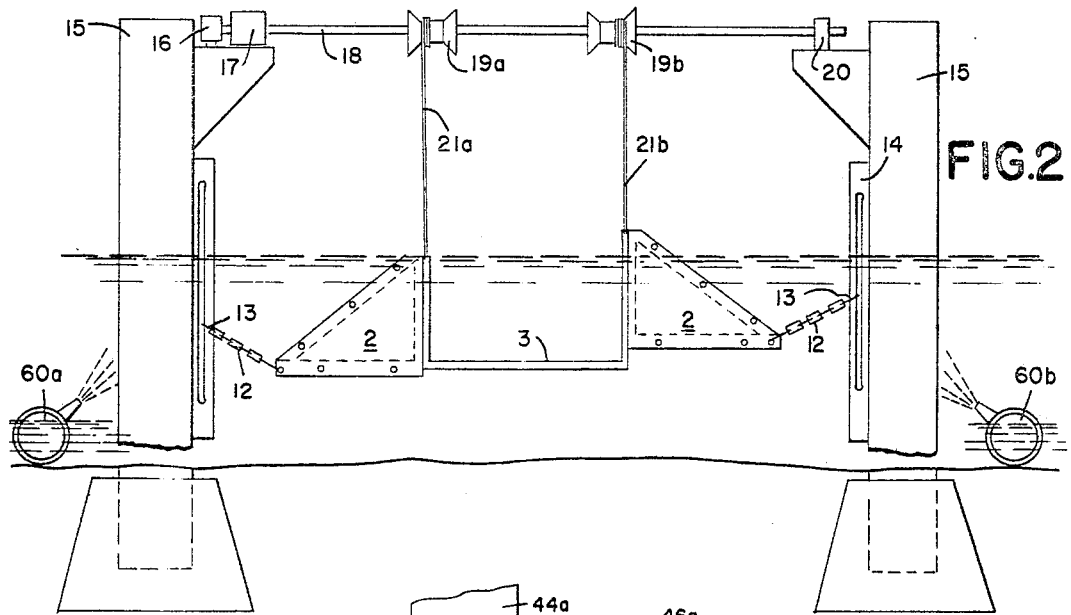
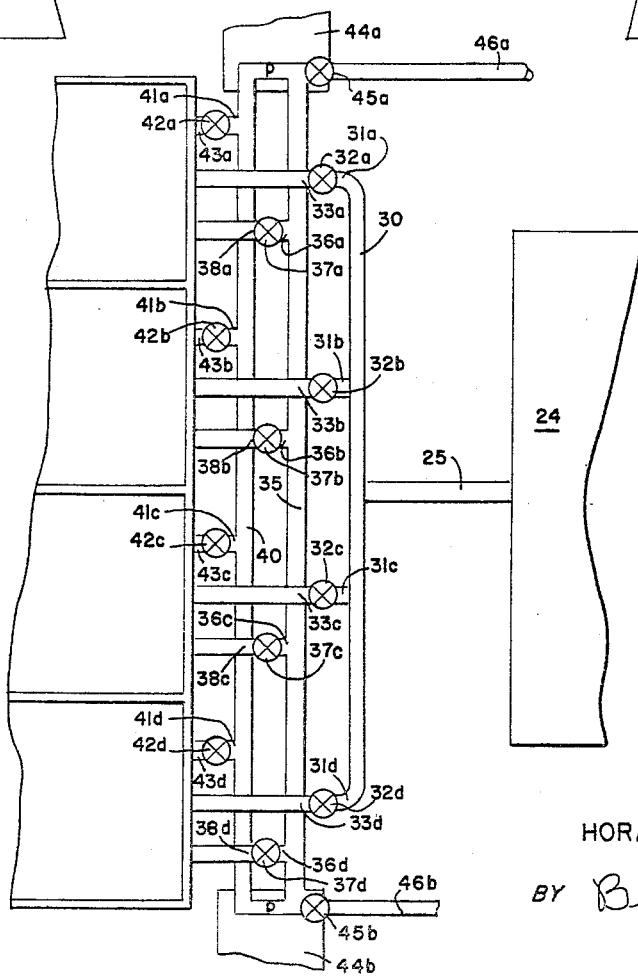

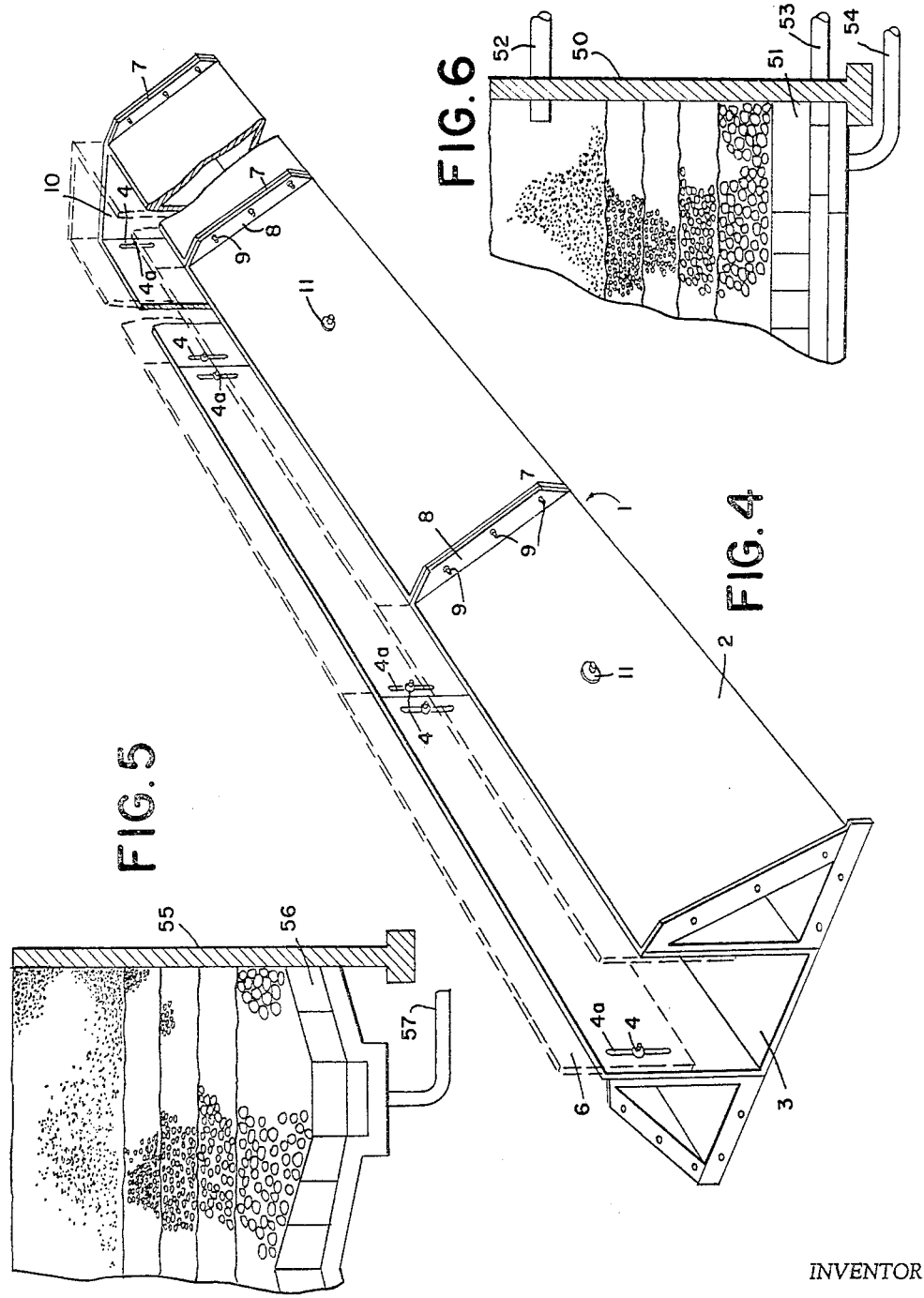

United States Patent Office
3,483,983
Patented Dec. 16, 1969

3,483,983
WATER PURIFICATION SYSTEM
Horace L. Lindstrom, State Highway 73,
Maple Shade, N.J. 08050
Filed July 14, 1967, Ser. No. 653,507
Int. Cl. C02b 1/00
U.S. Cl. 210—167               3 Claims

ABSTRACT OF THE DISCLOSURE

A water purification system having a water skimmer for removing water from large bodies of water, well system for storing water, filtering beds and a means for returning the purified water to the large body of water.

FIELD OF THE INVENTION

This invention relates to a water purification system having a water skimmer for removing water from large bodies of water, a well system for storing water, purification beds and a means for returning the purified water to the large body of water such as ponds, creeks, streams, lakes, rivers, channels, etc.

BACKGROUND OF THE INVENTION

Heretofore, an effective means for purifying large and/or open bodies of water such as ponds, creeks, streams, lakes, rivers, channels, etc. have not been available. The prior systems that have been used to purify open bodies of water have either been ineffective or the cost of installing and operating them has been prohibitive.

As surface bodies of water have become polluted from the waste of civilization and the development of industry the search for an effective and economical means for purifying water has materialized to the point to where it has become frantic. The present invention eliminates the defects of prior processes for purifying water and is effective, inexpensive to install and economical to operate.

SUMMARY OF THE INVENTION

It is an object of this invention to provide an effective water purification system for purifying ponds, creeks, streams, lakes, rivers, etc.

Another object is to provide an economical operating water purification system for purifying open bodies of water.

It is another object of this invention to provide a system whereby water, which may contain sludge and pollutants, may be removed from large bodies of water such as ponds, streams, lakes, rivers, etc., purified and returned to the large body of water.

And still another object is to provide a system for purifying open bodies of water by removing pollutants.

BRIEF DESCRIPTION OF THE INVENTION

In general, referring to FIG. 1, this invention comprises a water purification system for purifying large and/or open bodies of water. The system comprises a water skimmer 1 for removing a regulated amount of water from the large body of water. The water is removed from the skimmer 1 by pumps or siphons or gravity and introduced into the wet well 23 via a transductor 22 which may be flexible. The water is then removed from the wet well 23 by a pump, located in a pump room 24, and introduced into the filter beds 50 via an input manifold system 30. Valves are located in the input manifold system 30 so that a selection may be made as to which filter bed or beds are to be employed at any given time. The water traverses the filter bed 50 from top to bottom and the pollutants in the water are removed by the filtering materials. The purified water is removed from the filter bed 50 via an outlet and introduced into the return pumps 44a and 44b via the outlet manifold 35. The water is returned to the large body of water via the conduits 46a and 46b under pressure and by the nozzle arrangements 60a and 60b.

Also, incorporated with the filtering system is a method for cleaning the pollutants from the filter beds 50. The filter bads 50 are cleaned by back flushing. The purified water from filter beds 50 is back flushed via the back flush manifold 40 through the dirty filter bed and the water from said dirty bed is refiltered in the settlement or clean-out bed 55. The water from the clean-out bed 55 is returned to the large body of water via the conduit 56. When the clean-out bed becomes dirty and no longer functions then the filtering material such as sand and gravel is removed and new material installed. By back flushing the filter beds 50 to clean them, it is not necessary to remove and replace the filtering material from the filter beds 50. Thus, it is necessary only to provide means for removing the filtering material from the clean-out bed.

BRIEF DESCRIPTION OF THE DRAWINGS

Other objects and a fuller understanding of the invention may be had by referring to the following description and claims, taken in conjunction with the accompanying drawings in which:

FIG. 2 is a detailed and schematic illustration of the skimmer, hoisting means and water return nozzles;

FIG. 3 is a diagrammatic and schematic illustration of the manifold system;

FIG. 4 is a detailed view of the skimmer comprising the water trough, floats or ballasts, water flow control means and joints;

FIG. 5 is a detailed view of the clean out or back flush filter bed; and

FIG. 6 is a detailed view of the filter bed showing the water inlet, water outlet and back flush means.

DESCRIPTION OF THE PREFERRED EMBODIMENT

Water skimmer

Figure 1:
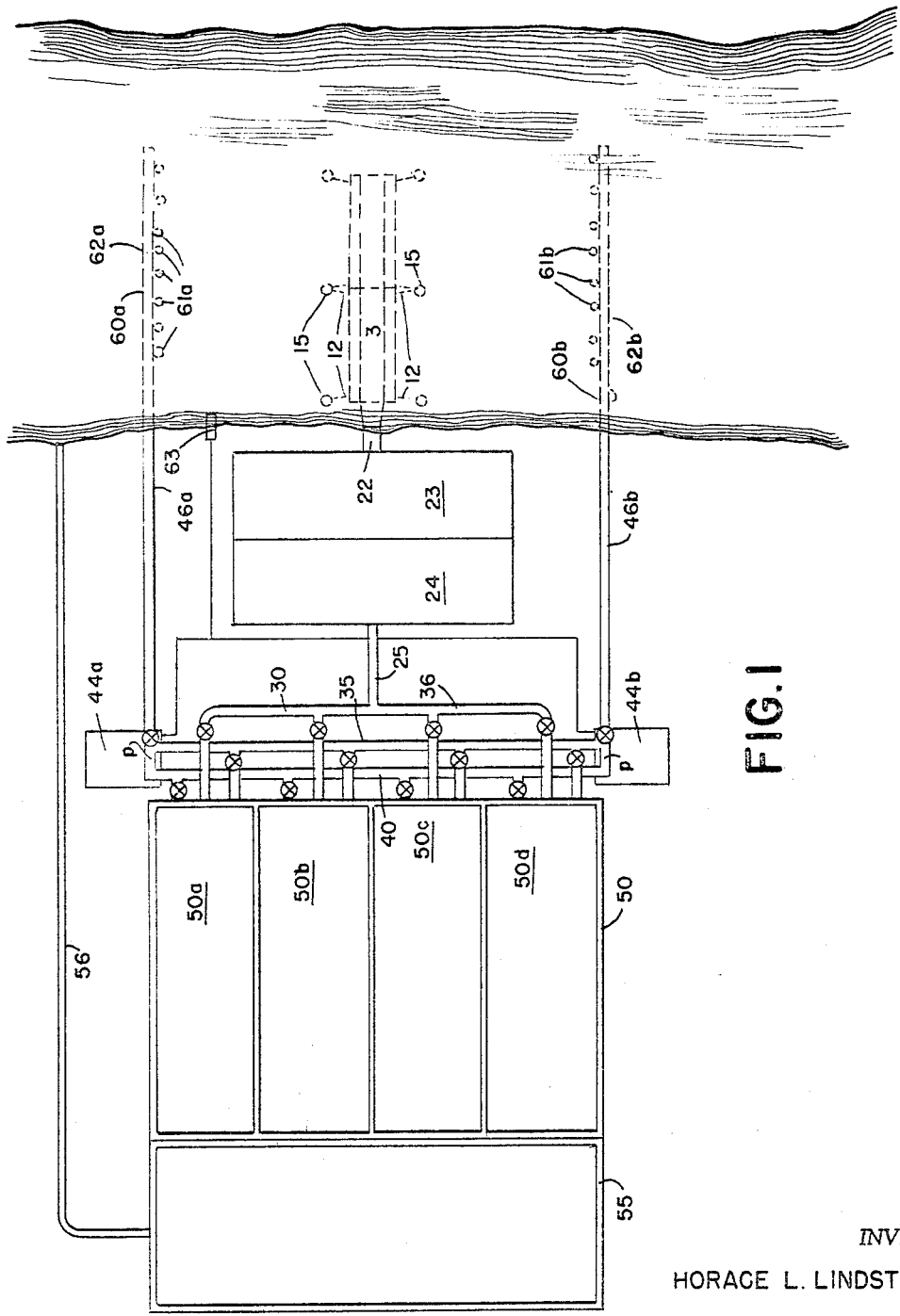
FIG. 1 is a diagrammatic and schematic illustration of the filtering system.

Referring to the drawings, the embodiment of this portion of the invention comprises a skimmer 1 for removing water from large bodies of water. The skimmer 1 which is a floating and self-adjusting skimmer comprises a trough 3 positioned between and connected to floats or ballasts 2. Adjustable or locking means 4 and 4a for varying the position of the trough 3 with respect to the ballasts are provided. Flow control gate 6, which is an optional feature, when used may be used either alone or in conjunction with the ballasts to regulate the water flow into the trough. The water flow control gates may be adjusted to regulate the amount of water flow into the trough 3 by the same means or similar as the ballasts are adjusted. The said ballasts 2 and/or flow gates 6 may be adjusted to permit water to flow at varying rates over the edge of the skimmer and into the trough 3.

The skimmer 1 is held in position by a flexible anchoring means such as by ropes, chains or cables 12 which are attached via a slip ring 13 and rod 14 to piling 15. The slip ring 13 and rod 14 permit the skimmer 1 to rise and fall with the water level of the stream, river, pond, lake, etc.

The longitudinal sections of the skimmer 1 may be joined together by spring-loaded bolts passing through flanges 8 at joints 7. The spring-loaded bolts permit the skimmer to flex with the turbulent conditions of the water. That is, when there are waves the skimmer 1 will flex or bend instead of having to undergo great strains and stresses. The trough 3 may vary in depth with the shallow end being extended out into the water. It is not necessary that the depth of the trough 3 vary in order to obtain a good supply of water, however, it is preferred that the bottom of the trough be slanted toward the shore.

The floats or ballasts 2 are ballasted in such a way as to permit their use as a means to control the amount of water entering the trough 3. The top edge of a float 2 on one side of the trough 3 may be raised above the surface of the water and the float 2 on the other side of the trough positioned at a predetermined depth below the surface of water thus permitting water to flow into the trough 3.

The adjustable flow control gates 6 when extended to their raised position extend above the surface of the water and when lowered permit the water to flow into the trough 3. The leading edge of the skimmer 1 is adjusted to permit water to flow into the trough 3 at a predetermined and controlled rate. The preferred rate of water flow over the water flow control means and into the trough 3 is about 1/64 to about 2 inches. The adjustable water flow regulating means is positioned to allow a predetermined amount of water to enter the trough 3 by adjustment slots 4a and locking means 4 which may be studs, nuts and bolts, screws, etc. However, the rate of flow of water permitted to enter the trough 3 may exceed the aforementioned limitations should it be desired to do so.

The floats 2 maintain the skimmer 1 at a predetermined and controlled depth in the water. The trough 3 carries the water to the shore where it is removed. Any means such as pumps or siphons or gravity may be used to remove the water from the trough 3.

The skimmer 1 may comprise one or a plurality of trough sections and float sections to form a unitary structure. The sections are held together at joint 7 by flanges 8 secured at holes 9 by any securing means. It is expected that some water will flow either into or out of the trough when the joints are in the flexed position. However, the water change will be so slight that it will cause little or no effect on the operation of the system.

The trough 3 may be adjusted to varying positions of depth with relationship to the ballasts or floats 2 by securing means 4 and 4a. The water flow control gate 6 may be regulated or adjusted in the same manner. The securing means may be studs, nuts and bolts, screws, etc.

Equal quantities of material such as water, air, etc. may be added to the float via valve 11 to regulate the depth of the skimmer in the water and also to regulate the water flow into the trough. Differential quantities of ballasting material may be employed in the various sections of the floats should such be desired. The floats may be triangular in cross section or any other geometric shape.

The depth of the trough 3 may vary, being shallow toward the outer end of the trough and gradually getting deeper next to the shore. The width may vary in a like manner. A plurality of sections of the skimmer may be connected together in order to make it as long as desired.

The water flows over the edge of the skimmer, into the trough and is removed at the bank or shore end by either siphon, pumps or gravity.

The skimmer 1 may be constructed of any rigid material such as metal, plastic, rubber, wood, etc. The height and width of the skimmer 1 may vary to suit the desired needs. However, from experience it has been found to limit the depth to less than 4 feet and the width to less than 8 feet. Of course, these dimensions may vary according to the particular needs and means of handling the skimmer 1.

The skimmer 1 may be raised out of the water by any means such as motors located on the top of the pilings or on the skimmer, a shaft, having lifting means such as cables extending from the shaft to the float, attached to the pilings, etc.

Referring to FIG. 2 the water skimmer 1 may be raised by a hoisting mechanism from the water for repairs, cleaning or to prevent damage to it. The hoisting means comprises a motor 16 attached to shaft 18 via gear box 17 located on top of the pilings 15. Attached to the shaft are spools or pulleys 20a and 20b which are connected to the skimmer 1 via a flexible means 21a and 21b such as cables or chains. The skimmer 1 is raised or lowered by activation of the motor 16. The motor or motors located on the pilings may be operated either singly or together. When it is desired to raise a single section of the skimmer 1, one or two of the motors 16 may be operated to lift the skimmer 1 out of the water. During freezing weather or any other occasion that the skimmer 1 could be damaged it may be raised and suspended by operating all the motors in unison.

WELL AND PUMP ROOM

The drawing, FIG. 1, depicts the wet well 23 and the pump room 24. The water from the water skimmer 1 is introduced into the wet well 24 via the transductor 22 which may be either rigid or flexible. Large debris which is in advertently passed by the water skimmer 1 is collected in the wet well 23 and removed. Also, the wet well 23 acts as a reservoir for the system in that it stores a supply of water. The water is passed from the wet well 23 into the pumping system housed in the pump room 24 where it may be chemically treated should such be desirable. The water is removed from the pump room 24 via conduit 25 and introduced into the manifold system 26.

MANIFOLD SYSTEM

The manifold system 26, FIG. 3, comprises a series of conduits and valves designated as input manifold 30, outlet manifold 35 and back flush manifold 40 arranged in such a manner as to make it possible to introduce water into the top of one or more of the filter beds 50 from the pump room 24, remove the purified water from the bottom of the filter beds 50 and transmit it to the pump or pumps located in pump rooms 44a and 44b where it may be either returned to the large body of water via conduit 46a and 46b and the nozzle system 60a and 60b or conveyed to the back flush manifold system 40 from which the water may be injected into the base of a polluted or contaminated filter bed 50 and used to back flush the bed.

The input manifold 30 is comprised of conduits 31a, 31b, 31c and 31d connected to conduits 33a, 33b, 33c and 33d via a plurality of valves 32a, 32b, 32c and 32d. The water is removed from the pump room 24 via conduit 25 and passed through the input manifold 30 into the filter beds 50. The output or return manifold 35 comprises conduits 36a, 36b, 36c and 36d respectively connected to conduits 38a, 38b, 38c and 38d via a plurality of valves 37a, 37b, 37c and 37d. The water is removed from the filter beds 50 via the outlet manifold 35 and sent to the return pumps in the pump rooms 44a and 44b. From the pump rooms 44a and 44b the water either may be returned to the large body of water via conduits 46a and 46b or used to purify a contaminated filter bed by back flushing the selected filter bed via the back flush manifold 40. The back flush manifold 40 comprises conduits 41a, 41b, 41c and 41d connected respectively to conduits 43a, 43b, 43c and 43d via a plurality of valves 42a, 42b, 42c and 42d.

FILTER BEDS

The filter beds 50, FIGS. 5 and 6, are permanent structures comprising large pits filled with filtering material. It is preferred that the filtering pits be constructed of concrete. The floor of the pit is lined with filtering blocks 51. The filtering blocks 51 are covered with other filtering material. The preferred filtering material comprises stone and sand. The larger stones are placed on the lower strata and progressively deminish in size toward the top strata which is a fine grain material such as sand. The water is admitted to the filter bed 50 via inlet 52 and purified water removed via outlet or return conduit 53 and returned to the large body of water under pressure by pumps contained in pump rooms 44a and 44b, conduits 46a and 46b and introduced into the nozzle system 60a and 60b.

The filter beds 50 may be cleansed by back flushing. The purified water from one of the other filter beds is introduced into the bottom of the bed to be cleansed via the back flush inlet 54 and removed via a back flush outlet and introduced into the back flush filter bed 55. The water is passed through the back flush filter bed 55 which is constructed in a similar manner as the filter beds 50 and returned to the large body of water via conduit 56. However, if desired the system may be constructed so that the water from the back flush filter bed 55 may be returned to the large body of water via the pumps in pump rooms 44a and 44b and the nozzle system 60a and 60b. The main difference between the back flush filter bed 55 and the standard filter beds 50 is that the back flush filter bed 55 is provided with means for removing the contaminated or polluted filtering material.

NOZZLE SYSTEM

The nozzle system 60a and 60b comprises conduits 62a and 62b, with a plurality of nozzles 61a and 61b for introducing the purified water back into the large body of water and to maintain it under pressure. The nozzle system 60a and 60b is directed in such a manner that the water around the water skimmer 1 is maintained in a state of agitation. The nozzles 61a and 61b are constructed with a spirally grooved barrel to further agitate the water. The purpose of agitating the water is to suspend pollutant material in the water and direct it toward the surface where the pollutant material and water are removed by the water skimmer 1. The selection of the proper nozzle system 60a and 60b in tidal water is controlled by the tidal flow control system which comprises a tidal flow indicator 63 which regulates the pumps in pump rooms 44a and 44b. Relief valves 45a and 45b are installed in the conduit between the pump and the nozzle system 60a and 60b to regulate the pressure maintained in the system.

Although the invention has been described in considerable detail with particular reference to certain preferred embodiments thereof, variations and modifications can be effected within the spirit and scope of the invention as described hereinbefore, and as defined in the appended claims.

I claim:

1. A water purification system for removing pollutants from a large body of contaminated water comprising a skimmer means for collecting the contaminated water; a wet well; a duct for conveying the contaminated water from said skimmer means to said wet well; a plurality of filter beds for purifying the contaminated water; a first pump for pumping the contaminated water from said wet well into said filter beds, a second pump and a conduit means for returning the purified water from said filter system under pressure to the bottom of the body of water; a nozzle means on said conduit means for distributing the pressurized purified water to agitate the contaminated water at the bottom of the large body of water so that pollutants will rise to the surface for collection in said skimmer means; an input manifold and an input valve means for conveying the contaminated water from said wet well to selected filter beds; an output manifold and output valve means for conveying purified water from said selected filter beds to said second pump; a backflush manifold connecting said second pump to said filter beds; a backflush valve means for selectively backwashing a filter bed, whereby the purified water can be used to clean said filter beds when they become saturated with pollutants; a return valve for closing the conduit means when the backflush valve means are opened; a backflush filter bed, means for conveying the water used to backwash said selected filter into said backflush filter bed, and an outlet pipe from the backflush filter bed to said second pump.

2. The purification system of claim 1, wherein said skimmer means comprises a trough for receiving the contaminated water, a float secured on each said of said trough which can be adjusted to vary the position of said trough with respect to said floats, a flow control means which regulates the rate the contaminated water is collected in said trough, and anchor means for said trough which will permit the trough to rise and fall with the level of the body of water.

3. The purification system of claim 2, further including a hoisting mechanism for removing the trough and floats from the body of water so that the trough and floats can be repaired, cleaned or to prevent damage.

References Cited

UNITED STATES PATENTS

| 647,780 | 4/1900 | Wilson | 210—264 |
|---|---|---|---|
| 838,626 | 12/1906 | Kirby | 210—525 X |
| 2,330,508 | 9/1943 | McColl | 210—242 |
| 2,628,190 | 2/1953 | Langdon | 210—525 X |
| 2,661,094 | 12/1953 | Stewart | 210—242 |
| 3,134,735 | 5/1964 | Greenleaf | 210—264 |

SAMIH N. ZAHARNA, Primary Examiner

U.S. Cl. X.R.

210—170, 258, 242, 264